(12) United States Patent
Liu et al.

(10) Patent No.: US 8,814,982 B2
(45) Date of Patent: Aug. 26, 2014

(54) TETRAZOLE FUNCTIONALIZED POLYMER MEMBRANES

(71) Applicant: UOP LLC, Des Plaines, IL (US)

(72) Inventors: Chunqing Liu, Arlington Heights, IL (US); Mark E. Schott, Palatine, IL (US); Travis C. Bowen, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 145 days.

(21) Appl. No.: 13/654,516

(22) Filed: Oct. 18, 2012

(65) Prior Publication Data

US 2013/0145931 A1 Jun. 13, 2013

Related U.S. Application Data

(60) Provisional application No. 61/568,385, filed on Dec. 8, 2011.

(51) Int. Cl.
*B01D 53/22* (2006.01)

(52) U.S. Cl.
USPC .................. 95/45; 95/47; 95/51; 95/54; 96/4; 96/14

(58) Field of Classification Search
USPC .............................. 95/45, 47, 51, 54; 96/4, 14
See application file for complete search history.

(56) References Cited

U.S. PATENT DOCUMENTS

| | | | | |
|---|---|---|---|---|
| 4,923,901 A * | 5/1990 | Koester et al. | ................... | 521/53 |
| 5,240,811 A * | 8/1993 | Taylor et al. | ............... | 430/270.1 |
| 5,928,835 A * | 7/1999 | Hirabayashi et al. | ......... | 430/265 |
| 7,795,355 B2 * | 9/2010 | Matyjaszewski et al. | . | 525/328.2 |
| 8,586,125 B2 * | 11/2013 | Hossainy et al. | ............... | 427/2.1 |
| 8,623,928 B2 * | 1/2014 | Du et al. | ......................... | 521/32 |
| 2006/0159974 A1 * | 7/2006 | Li et al. | ........................... | 429/33 |
| 2006/0280982 A1 * | 12/2006 | Kanaoka et al. | ................ | 429/33 |
| 2007/0015024 A1 * | 1/2007 | Kanaoka et al. | ................ | 429/33 |
| 2007/0244265 A1 * | 10/2007 | Matyjaszewski et al. | .... | 525/376 |
| 2008/0166736 A1 * | 7/2008 | Lu et al. | ......................... | 435/7.1 |
| 2009/0068524 A1 * | 3/2009 | Li et al. | ............................. | 429/30 |
| 2011/0060107 A1 * | 3/2011 | Matyjaszewski et al. | .... | 525/196 |
| 2012/0202129 A1 * | 8/2012 | Andreopoulou et al. | ..... | 429/409 |
| 2013/0145931 A1 * | 6/2013 | Liu et al. | ........................... | 95/45 |
| 2013/0146538 A1 * | 6/2013 | Liu et al. | ....................... | 210/650 |
| 2013/0247756 A1 * | 9/2013 | Li et al. | ............................. | 95/45 |

* cited by examiner

*Primary Examiner* — Jason M Greene
*Assistant Examiner* — Anthony Shumate
(74) *Attorney, Agent, or Firm* — Mark Goldberg

(57) ABSTRACT

The present invention discloses a new type of high selectivity UV-cross-linked tetrazole group functionalized polymer nanosieve (TZPIM) membranes, their preparation, as well as their use for gas and liquid separations. The UV-cross-linked TZPIM membrane showed more than 50% improvement in $CO_2/CH_4$ selectivity and more than 30% improvement in $CO_2/N_2$ selectivity compared to the uncross-linked TZPIM membrane for $CO_2/CH_4$ and $CO_2/N_2$ separations, respectively.

10 Claims, No Drawings

TETRAZOLE FUNCTIONALIZED POLYMER MEMBRANES

CROSS-REFERENCE TO RELATED APPLICATION

This application claims priority from Provisional Application No. 61/568,385 filed Dec. 8, 2011, the contents of which are hereby incorporated by reference.

BACKGROUND OF THE INVENTION

Recently, McKeown et al. reported the synthesis of a new type of polymer, termed polymers of intrinsic microporosity (PIMs), with a randomly contorted molecular structure, bridging the void between microporous and polymeric materials. The rotational freedom of these PIM materials has been removed from the polymer backbone. These polymers exhibit properties analogous to those of conventional microporous materials including large and accessible surface areas, interconnected micropores of less than 2 nm in size, as well as high chemical and thermal stability, but, in addition, possess some favorable properties of conventional polymers including good solubility and easy processability for the preparation of polymeric membranes. Polymeric membranes have been prepared directly from some of these PIMs and both the liquid and gas separation performances have been evaluated. Membranes from PIMs have shown exceptional properties (e.g. extremely high gas permeability) for separation of commercially important gas pairs, including $O_2/N_2$ and $CO_2/CH_4$. The exceptionally high permeability of gases arises from the rigid but contorted molecular structures of PIMs, frustrating packing and creating free volume, coupled with chemical functionality giving strong intermolecular interactions. Two published PCT patent applications provide further detail: WO 2005/012397 A2 and WO 2005/113121 A1, both applications incorporated by reference in their entireties. Membranes from PIMs, however, have much lower selectivities for commercially important gas pairs, such as $O_2/N_2$ and $CO_2/CH_4$, although their gas permeabilities are significantly higher than those of commercial polymeric membranes from glassy polymers such as CA, polyimides, and polyetherimides.

Most recently, Guiver et al. reported $CO_2$-philic tetrazole group functionalized polymer nanosieve membranes (TZ-PIMs) for $CO_2$-capture applications. The TZPIM membrane materials were prepared by [2+3] cyclo-addition modification of PIM-1 polymer containing an aromatic nitrile group with an azide compound. The TZPIM membranes showed enhanced $CO_2$-philic separation selectivities due to interactions between $CO_2$ and the tetrazole compared to PIM-1 membrane. See NATURE MATER., 2011, 10, 372.

The following reactions illustrate the preparation and structures of PIM-1 polymer and the TZPIM polymer, respectively.

Formula 1: Preparation and structure of PIM-1 polymer

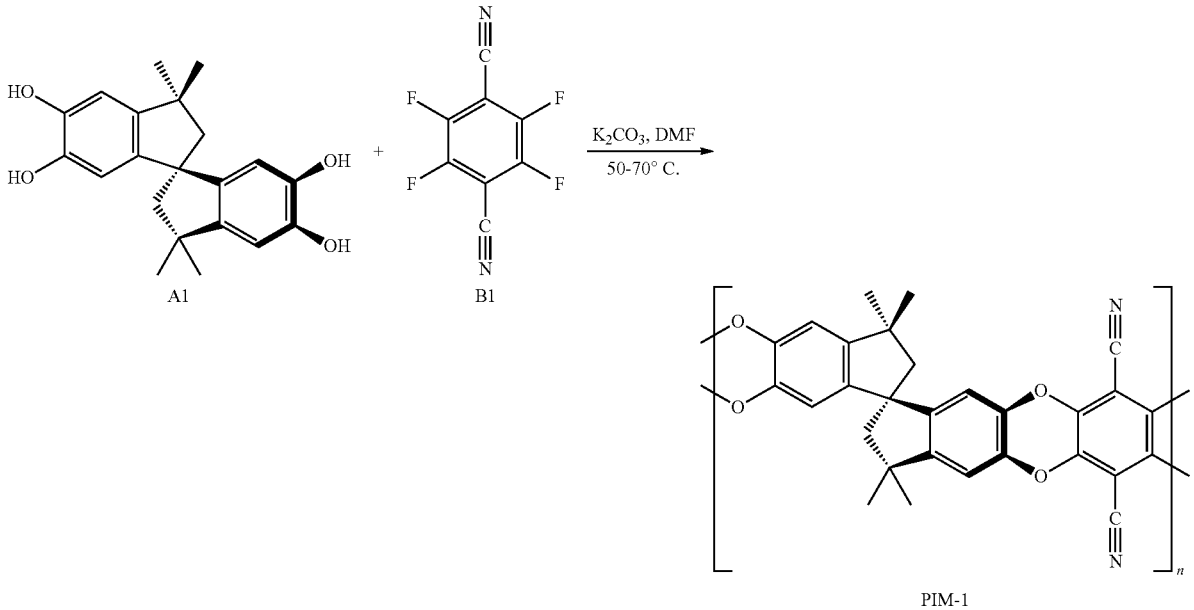

Formula 2: Preparation and structure of TZPIM polymer

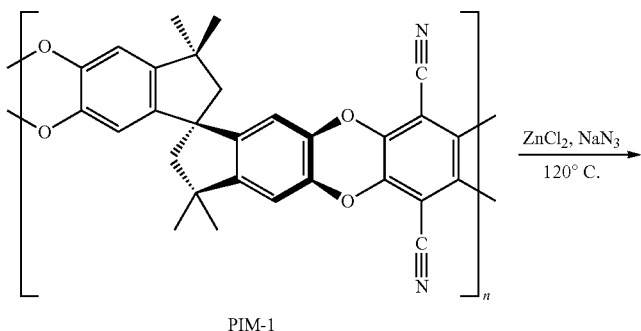

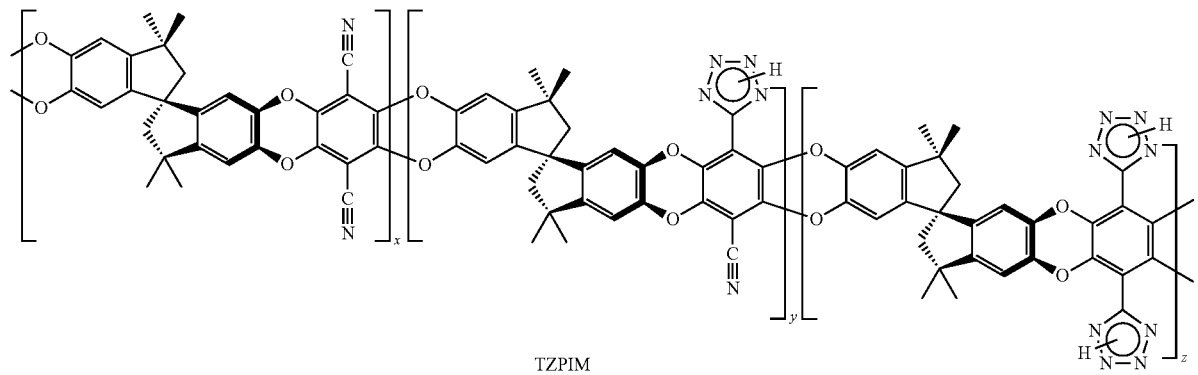

TZPIM

The present invention involves a UV-cross-linking method to further improve the performance of the membrane with improvements to selectivity, chemical resistance, and long-term performance stability of TZPIM membranes. In particular, particularly the selectivities for separation of gas pairs such as $CO_2/N_2$, $CO_2/H_2$, $CH_4/N_2$, $H_2/CH_4$, $H_2S/CH_4$, $O_2/N_2$, and $CO_2/CH_4$ are improved through the formation of interpolymer-chain-connected cross-linked networks.

DESCRIPTION OF THE INVENTION

The present invention involves high permeance and high selectivity UV-cross-linked TZPIM membranes, their preparation as well as their use for gas and liquid separations. More specifically, the invention involves methods of making UV-cross-linked TZPIM membranes. These membranes were prepared by cross-linking the TZPIM membranes by exposure to UV-radiation. The UV-cross-linked TZPIM membranes have improved separation performance such as selectivity, chemical resistance, $CO_2$ and hydrocarbon plasticization resistance, and long-term performance stability compared to TZPIM membranes that have not been cross-linked. Membrane selectivities for gas and liquid separations such as $CO_2/CH_4$, $CO_2/N_2$, $CO_2/H_2$, $CH_4/N_2$, $H_2/CH_4$, $O_2/N_2$, $H_2S/CH_4$, olefin/paraffin, deep desulfurization of gasoline and diesel fuels, and ethanol/water separations through the formation of interpolymer-chain-connected cross-linked networks are particularly enhanced by the present invention.

The UV-cross-linked TZPIM polymer membranes were prepared by UV-cross-linking the TZPIM membranes containing UV-cross-linkable nitrile (—CN) group using a UV lamp from a predetermined distance and for a period of time selected based upon the separation properties sought. Preferably, the molar ratio of the UV-cross-linkable nitrile groups to the tetrazole groups in the TZPIM polymer of the present invention is in the range of 1:4 to 4:1. More preferably, the molar ratio of the UV-cross-linkable nitrile groups to the tetrazole groups in the TZPIM polymer of the present invention is in the range of 1:2 to 2:1. For example, UV-cross-linked TZPIM membranes can be prepared from TZPIM membranes by exposure to UV radiation using 254 nm wavelength UV light generated from a UV lamp located a 1.9 cm (0.75 inch) distance from the membrane surface to the UV lamp with a radiation time of about 30 minutes at ≤50° C. The UV lamp used in the examples herein is a low pressure, mercury arc immersion UV quartz 12 watt lamp with 12 watt power supply from Ace Glass Incorporated. Optimization of the cross-linking degree in the UV-cross-linked TZPIM polymer membranes will promote the tailoring of membranes for a wide range of gas and liquid separations with improved permeation properties and environmental stability. The cross-linking degree of the UV-cross-linked TZPIM polymer membranes can be controlled by adjusting the distance between the UV lamp and the membrane surface, UV radiation time, wavelength and intensity of UV light, etc. Preferably, the distance from the UV lamp to the membrane surface is in the range of about 0.8 to 25.4 cm (0.3 to 10 inches) with a UV light provided that has from 12 watt to 450 watt from a low pressure or medium pressure mercury arc lamp, and the UV radiation time is in the range of about 1 minute to 1 hour. More preferably, the distance from the UV lamp to the membrane surface is in the range of about 1.3 to 5.1 cm (0.5 to 2 inches) with a UV light provided from a 12 watt to 450 watt low pressure or medium pressure mercury arc lamp, and the UV radiation time is in the range of 1 to 40 minutes.

The UV-cross-linked TZPIM polymer membranes of the present invention can be fabricated into any convenient form such as sheets, tubes or hollow fibers. These membranes can also be fabricated into thin film composite membranes comprising a selective thin layer of a UV-cross-linked TZPIM material and a porous supporting layer of an inorganic material or a polymeric material different from the UV-cross-linked TZPIM material.

The UV-cross-linked TZPIM polymer membranes of the present invention are especially useful in the purification, separation or adsorption of a particular species in the liquid or gas phase.

These UV-cross-linked TZPIM polymer membranes are especially useful in gas separation processes in air purification, petrochemical, refinery, and natural gas industries.

Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the UV-cross-linked TZPIM polymer membranes described herein. More than two gases can be removed from a third gas. For example, some of the gas components which can be selectively removed from a raw natural gas using the membranes described herein include carbon dioxide, oxygen, nitrogen, water vapor, hydrogen sulfide, helium, and other trace gases. Some of the gas components that can be selectively retained include hydrocarbon gases.

EXAMPLES

The following examples are provided to illustrate one or more preferred embodiments of the invention, but are not limited embodiments thereof. Numerous variations can be made to the following examples that lie within the scope of the invention.

Example 1

Preparation of TZPIM Polymer

PIM-1 polymer containing nitrile groups was synthesized from monomers 3,3,3',3'-tetramethyl-1,1"-spirobisindane-5,5',6,6'-tetrol (A1) and 2,3,5,6-tetrafluoroterephthalonitrile (B1) as shown in Formula 1 following a procedure reported by Budd, et al. (see MACROMOL. SYM., 2006, 245, 403). An efficient dibenzodioxane-forming reaction (i.e. aromatic nucleophilic substitution) between the aromatic tetrol monomer A1 with the appropriate fluorine-containing compound B1 gave soluble PIM-1 with a high yield. PIM-1 is freely soluble in methylene chloride, tetrahydrofuran (THF), and chloroform. PIM-1 was purified by repeated precipitation from THF solution into methanol and when collected by filtration gave a fluorescent yellow free-flowing powder.

TZPIM polymer was synthesized from PIM-1 as shown in Formula 2 using a procedure similar to that reported by Du, et al. (see NATURE MATER., 2011, 10, 372). In this procedure, 3.0 g of PIM-1 was dissolved in 45.0 g of anhydrous N-methylpyrrolidone (NMP). 3.38 g of $NaN_3$ and 3.54 g of anhydrous $ZnCl_2$ (molar ratio of nitrile groups on PIM-1/$NaN_3$/$ZnCl_2$=1:4:2) were added. 7.0 g of THF solvent was added to the mixture after about 1 hour. The mixture was stirred at 120° C. for four days. After cooling to 60° C., 20.0 g of diluted HCl (1:50 by volume in water) was added, and the reaction mixture was maintained at this temperature for 5 hours. The TZPIM thus obtained was then precipitated into excess 1 M HCl, filtered, washed with dilute HCl and water, and dried in a vacuum oven at 120° C. This TZPIM synthesis procedure resulted in a 55 mol % conversion of nitrile groups in PIM-1 polymer to tetrazole groups.

Example 2

Preparation of TZPIM Membrane

The TZPIM membrane was prepared as follows: 0.8 g of TZPIM polymer synthesized in Example 1 was dissolved in 30 g of DMAc. The mixture was mechanically stirred for 2.5 hours to form a homogeneous casting dope. The resulting homogeneous casting dope was filtered and poured into a Teflon-coated Petri dish, and dried at 80° C. The membrane together with the Teflon-coated Petri dish was then put into a vacuum oven and was dried at 120° C. under vacuum for at least 24 hours. The TZPIM membrane was cut into a small circle for pure gas permeation measurements.

Example 3

Preparation of UV Cross-Linked TZPIM Membranes

The UV-cross-linked TZPIM polymer membranes were prepared by further UV-cross-linking the TZPIM membranes containing UV-cross-linkable nitrile groups using a UV lamp from a certain distance and for a period of time selected based upon the separation properties sought. For example, one UV-cross-linked TZPIM membrane (abbreviated as TZPIM-UV10) was prepared from TZPIM membrane obtained in Example 2 by exposure to UV radiation using 254 nm wavelength UV light generated from a UV lamp with 1.9 cm (0.75 inch) distance from the membrane surface to the UV lamp and a radiation time of 10 minutes. Another UV-cross-linked TZPIM membrane (abbreviated as TZPIM-UV20) was prepared from TZPIM membrane obtained in Example 2 by exposure to UV radiation using 254 nm wavelength UV light generated from a UV lamp with 1.9 cm (0.75 inch) distance from the membrane surface to the UV lamp and a radiation time of 20 minutes.

Example 4

Evaluation of the $CO_2/CH_4$ and $CO_2/N_2$ Separation Performance of TZPIM, TZPIM-UV10, and TZPIM-UV20 Membranes The permeabilities of $CO_2$, $N_2$, and $CH_4$ ($P_{CO2}$, $P_{N2}$, and $P_{CH4}$) and selectivities for $CO_2/CH_4$ ($\alpha_{CO2/CH4}$) and $CO_2/N_2$ ($\alpha_{CO2/N2}$) of TZPIM, TZPIM-UV10, and TZPIM-UV20 membranes prepared in Examples 1-3 were measured by pure gas measurements at 50° C. under about 791 kPa (100 psig) pressure. The results are shown in the following table. The results show that the UV cross-linked TZPIM-UV10 membrane showed improved $\alpha_{CO2/CH4}$ and $\alpha_{CO2/N2}$ compared to TZPIM membrane without UV cross-linking Most importantly, it has been demonstrated that the cross-linking degree of TZPIM membrane can be controlled by adjusting the UV radiation time. As shown in the following table, the UV cross-linked TZPIM-UV-20 membrane which was cross-linked for 20 minutes under UV radiation showed further enhanced $\alpha_{CO2/CH4}$ and $\alpha_{CO2/N2}$ compared to TZPIM-UV 10 membrane that was cross-linked for 10 min under UV radiation.

| Pure gas permeation test results of TZPIM, TZPIM-UV10, and TZPIM-UV20 membranes for $CO_2/CH_4$ and $CO_2/N_2$ separations[a] | | | |
|---|---|---|---|
| Membrane | $P_{CO2}$ (Barrer) | $\alpha_{CO2/CH4}$ | $\alpha_{CO2/N2}$ |
| TZPIM | 1506.1 | 14.3 | 22.4 |
| TZPIM-UV10 | 725.1 | 22.2 | 30.6 |
| TZPIM-UV20 | 698.9 | 26.3 | 34.4 |

[a]Tested at 50° C. under 791 kPa (100 psig) pure gas pressure;
1 Barrer = $10^{-10}$ $(cm^3(STP) \cdot cm)/(cm^2 \cdot sec \cdot cmHg)$

Example 5

Preparation of Thin Film Composite (TFC) TZPIM Membrane

A 2 wt % TZPIM polymer solution was prepared by dissolving 0.8 g of TZPIM polymer synthesized in Example 1 in a solvent mixture consisting of 19.6 g of 1,2,3-trichloropropane and 19.6 g of dichloromethane. The solution was filtered using a 1 micron-sized filter to remove any insoluble impurities and debubbled overnight. One drop of TZPIM polymer solution was introduced to the surface of a pure water bath. The TZPIM solution spread on the surface of water with simultaneous solvent evaporation to form a thin TZPIM film on the surface of water. The thin TZPIM film on the surface of water was then laminated onto the surface of a low selectivity, high permeance porous polymeric support membrane. The resulting TFC TZPIM membrane was dried at 70° C. for 1 hour in a conventional oven.

The surface of the TZPIM layer of the TFC TZPIM membrane was dip coated with a RTV615A/615B silicone rubber solution. The coated membrane was dried inside a hood at room temperature for 30 minutes and then dried at 70° C. for 1 hour in a conventional oven.

Example 6

Preparation of UV Cross-Linked TFC TZPIM Membranes

The UV-cross-linked TFC TZPIM polymer membranes were prepared by further UV-cross-linking the TFC TZPIM membranes containing UV-cross-linkable nitrile groups using a UV lamp from a certain distance and for a period of time selected based upon the separation properties sought. For example, one UV-cross-linked TFC TZPIM membrane was prepared from TFC TZPIM membrane obtained in Example 5 by exposure to UV radiation using 254 nm wavelength UV light generated from a UV lamp with 10 cm (3.94 inches) distance from the membrane surface to the UV lamp and a radiation time of 3.5 minutes. Another UV-cross-linked TFC TZPIM membrane was prepared from TFC TZPIM membrane obtained in Example 5 by exposure to UV radiation using 254 nm wavelength UV light generated from a UV lamp with 10 cm (3.94 inches) distance from the membrane surface to the UV lamp and a radiation time of 5 minutes.

The invention claimed is:

1. A process for separating a mixture of gases comprising contacting said mixture of gases with a UV-cross-linked tetrazole functionalized polymer nanosieve membrane.

2. The process of claim 1 wherein said mixture of gases comprises atmospheric air containing at least one volatile organic compound.

3. The process of claim 1 wherein said mixture of gases comprises nitrogen and oxygen.

4. The process of claim 1 wherein said mixture of gases comprises carbon dioxide in natural gas.

5. The process of claim 1 wherein said mixture of gases comprises a pair of gases selected from the group consisting of hydrogen and nitrogen, nitrogen and oxygen and nitrogen and atmospheric air.

6. The process of claim 1 wherein said mixture of gases comprises a mixture of propylene and propane or iso paraffins and normal paraffins.

7. The process of claim 1 wherein said mixture of gases comprises at least two gases selected from carbon dioxide, oxygen, nitrogen, water vapor, hydrogen sulfide, helium and trace gases wherein said gases are impurities in natural gas.

8. A membrane comprising a UV-cross-linked tetrazole functionalized polymer.

9. A method for preparing a UV-cross-linked tetrazole functionalized polymer comprising exposing polymer comprising a structure of (I)

(I)

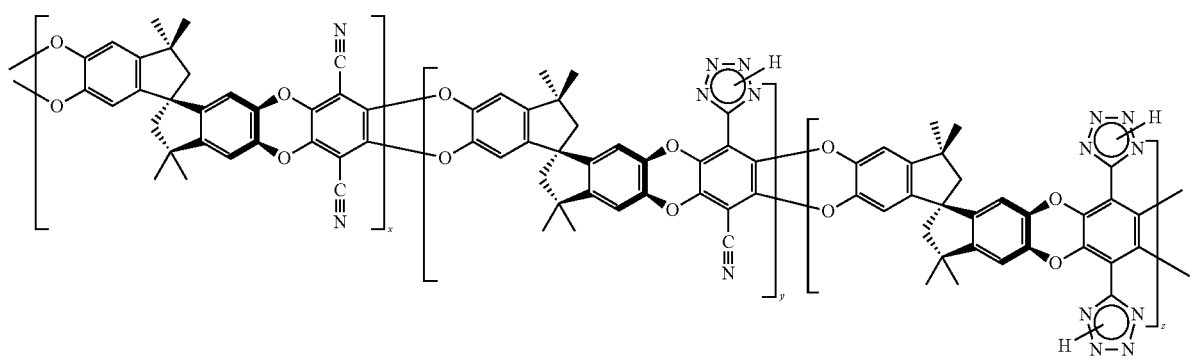

TZPIM to UV radiation, wherein the ratio of (2x+y) to (y+2z) is in a range of 4:1 to 1:4.

10. The method of claim 9 wherein said ratio of (2x+y) to (y+2z) is in a range of 2:1 to 1:2.

* * * * *